Nov. 5, 1957 G. ROSENQVIST 2,812,294
METHOD OF MANUFACTURING HOLLOWED ARTICLES
Original Filed Feb. 11, 1947 5 Sheets-Sheet 1
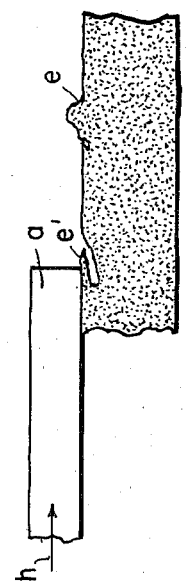
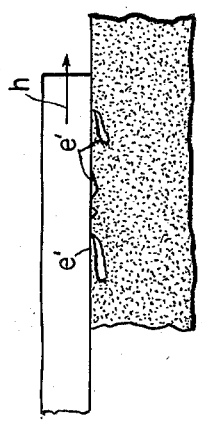
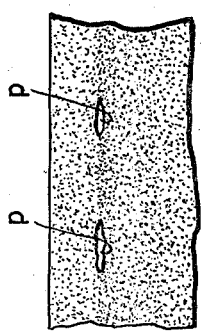
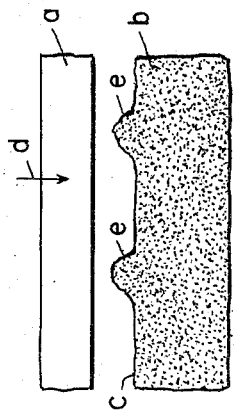
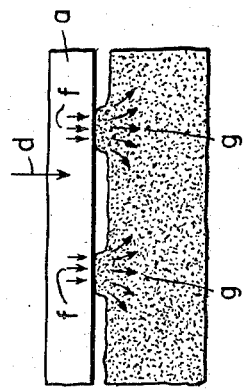
INVENTOR
GUNNAR ROSENQVIST
BY
ATTORNEY Nov. 5, 1957  G. ROSENQVIST  2,812,294
METHOD OF MANUFACTURING HOLLOWED ARTICLES
Original Filed Feb. 11, 1947  5 Sheets-Sheet 2

INVENTOR
GUNNAR ROSENQVIST

BY
ATTORNEY

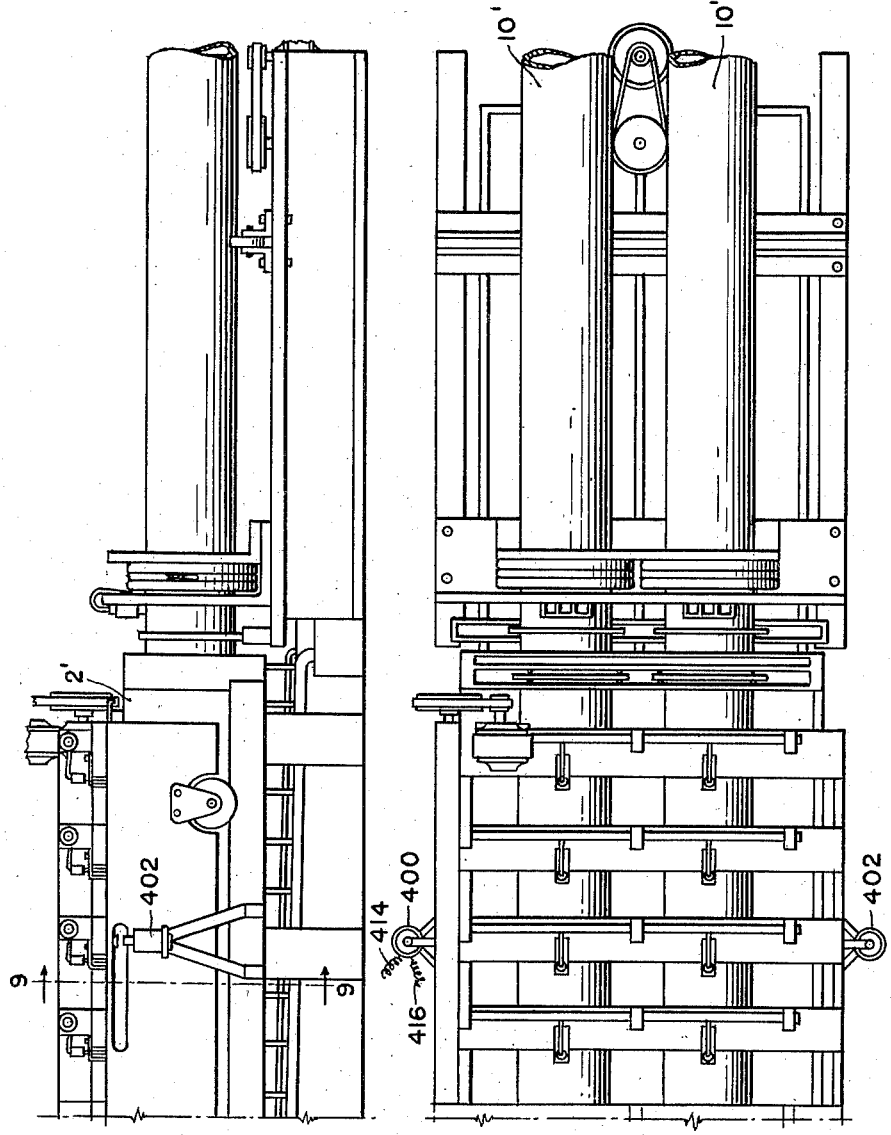

Nov. 5, 1957  G. ROSENQVIST  2,812,294
METHOD OF MANUFACTURING HOLLOWED ARTICLES
Original Filed Feb. 11, 1947  5 Sheets-Sheet 4
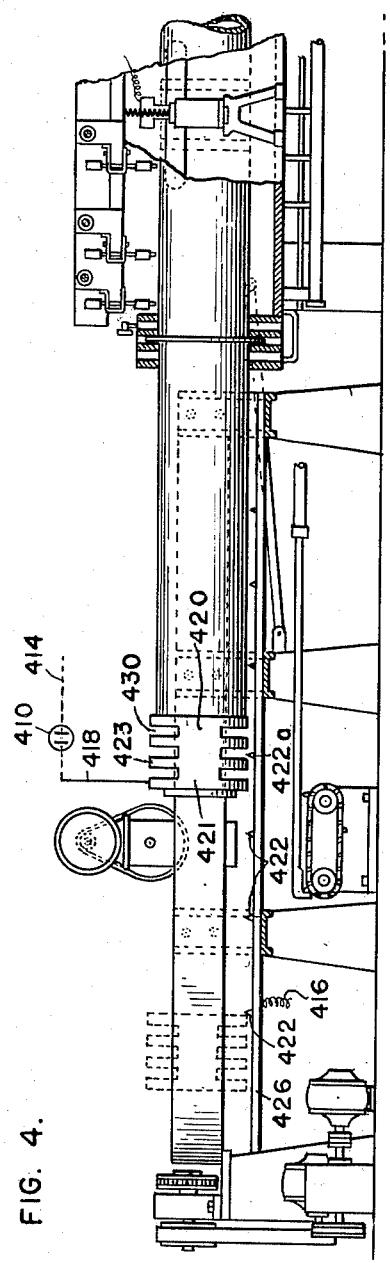
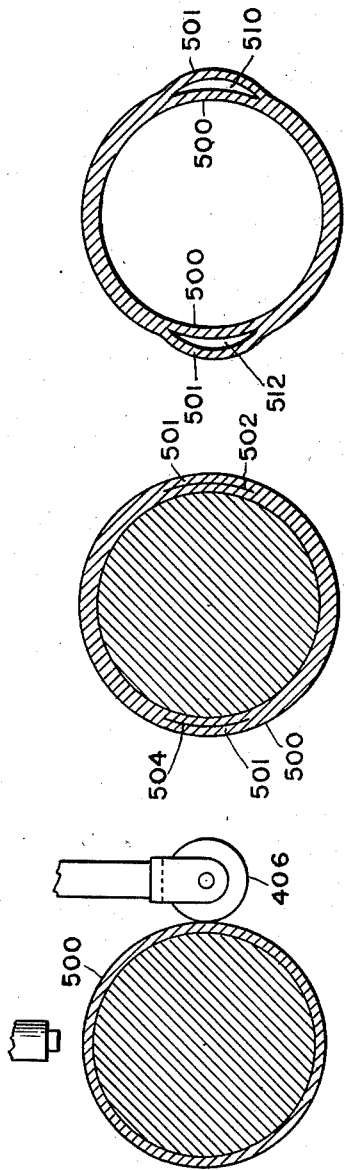
INVENTOR
GUNNAR ROSENQVIST
BY
ATTORNEY Nov. 5, 1957  G. ROSENQVIST  2,812,294
METHOD OF MANUFACTURING HOLLOWED ARTICLES
Original Filed Feb. 11, 1947  5 Sheets-Sheet 5
FIG. 8.
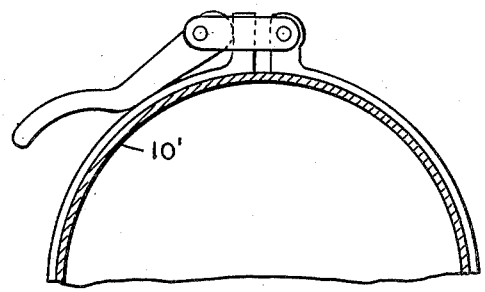
FIG. 9.
FIG. 10.
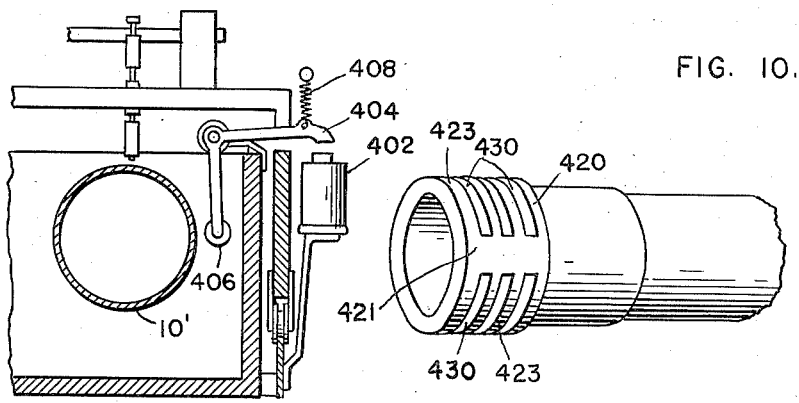
FIG. 12.
FIG. 11.
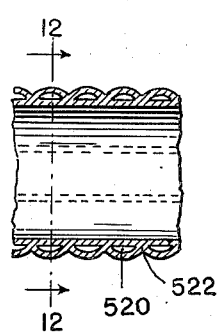
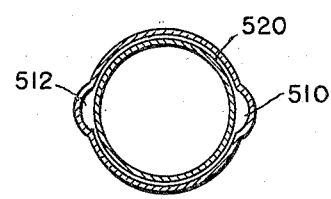
INVENTOR
GUNNAR ROSENQVIST
BY
ATTORNEY

United States Patent Office 2,812,294
Patented Nov. 5, 1957

2,812,294

METHOD OF MANUFACTURING HOLLOWED ARTICLES

Gunnar Rosenqvist, Calumet, Mich.

Original application February 11, 1947, Serial No. 727,793. Divided and this application November 15, 1950, Serial No. 208,819

5 Claims. (Cl. 204—3)

This invention relates to the manufacture of metal articles by electrolytic deposition and is a continuation in part of my applications Ser. No. 460,220, filed September 30, 1942, and Ser. No. 443,288, filed May 16, 1942, now abandoned, and is a division of my application filed February 11, 1947, Ser. No. 727,793, now Patent No. 2,540,175.

A primary object of my invention is to provide for the utilization selectively of either or both of two methods of mechanically displacing or working metal particles as they are deposited electrolytically, to afford two kinds of internal structure in the electrodeposited metal. These two methods differ fundamentally from each other.

One method consists of moving surface particles of the cathode, or electrodeposited metal, in directions laterally of the cathode surface to positions loosely superimposed on the outside of the surrounding cathode surface, and is effected by abrading, grinding, or otherwise frictionally working the deposited metal. The particles as thus displaced have little or no bond with the cathode surface and, when covered over by further electrodeposition, form laminations within the structure enclosing plating solution which expands on subsequent heating to form pockets within the metal structure.

The other method consists of moving metal particles from one position to another entirely within the cathode surface, and is effected by pressing on the surface particles of the cathode only in directions normal to the surface of working contact thereby avoiding frictional abrasion. In accordance with this method, there being no loosely superimposed particles on top of the cathode surface, that surface will be built up by further electrodeposition into a sound structure that has no laminations or pockets.

These methods are performed mechanically by the use of a tool and thus I have found that the use of a tool permits a choice of working actions and that by changing the participation of friction forces during working contact different internal structures in the electrodeposited metal may be obtained for different desired purposes.

In commercial adaptations of my methods the tool has a working face which is small in comparison with the area of the cathode surface and in order that all areas of the surface may be worked by the used of such a tool, it is necessary that the tool traverse the surface, as well as press against it. Despite such traverse motion I assure selectivity of the working actions above referred to. Thus, to avoid any frictional sliding between the tool and the cathode surface during working contact one embodiment of my invention employs a cathode surface which moves intermittently and is held motionless during contact of the tool with the surface of the deposited metal and another embodiment employs a cathode surface which, although moving continuously, is virtually motionless during such contact because the tool breaks contact with the metal surface immediately upon striking it so that there is no opportunity for lateral relative movement during contact. Where, on the contrary, I desire frictional sliding between the tool and the cathode surface in selected areas I provide a further embodiment in which such sliding occurs but in which it is controlled for the purposes intended.

By my invention I believe I have achieved for the first time electrolytically refined copper cathodes of commercially satisfactory internal structure in shapes that can be used directly for further fabrication of sheets, tubes, etc., thus eliminating the standard practice of melting, casting, scalping, piercing or extruding, and several initial drawing operations, when making redraw stock for seamless copper tubing; and the quality of my electrolytic cathodes is not only satisfactory but far superior to anything yet put on the market due to its freedom from oxide and its perfectly sound internal structure.

In the drawings:

Figs. 1a, 1b and 1c illustrate diagramatically the method of working, without frictional abrasion, and Figs. 1x, 1y and 1z show the other method, employing frictional abrasion;

Fig. 2a is a side elevation view of the delivery end of that machine—Figs. 2 and 2a together showing the complete machine;

Figs. 3 and 3a are plan views corresponding to Figs. 2 and 2a;

Fig. 4 is a side elevation view corresponding to Fig. 2 with parts omitted;

Figs. 5, 6 and 7 are vertical sections through a mandrel and tubing showing progressive stages of the manufacture of the tubing;

Fig. 8 is a detail vertical section of a portion of the tubing showing a clutch;

Fig. 9 is a vertical section on line 9—9 of Fig. 2a;

Fig. 10 is a perspective view of the pattern mounted on the end of the mandrel;

Fig. 11 is a longitudinal section of one form of tubing, and

Fig. 12 is a vertical section taken on line 12—12 of Fig. 11.

Figure 2:
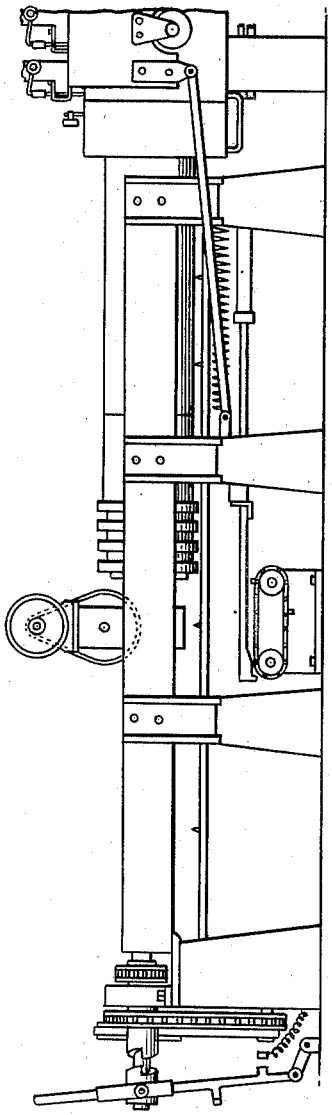
Fig. 2 is a side elevation view of the inlet end of a machine embodying my invention.

In my prior application Ser. No. 727,793, now Patent No. 2,540,175, I have illustrated and described a machine for working electrodeposited metal by so hammering it during the deposition that frictional abrasion during the hammering is avoided and a deposition without flaws is achieved.

In Figs. 1a and 1b and 1c I have shown diagramatically on greatly enlarged scale the working action thus effected. The reference a designates the hammer or tool approaching the metal b in a direction substantially perpendicular to the cathode surface c as indicated by the arrow d. On the cathode surface c are protrusions e formed by crystal growth during the electrodeposition.

In Fig. 1b the hammer a has pressed against the protrusions e in a direction normal to the surface of working contact as indicated by arrows f causing the metal particles to flow within the cathode surface c as indicated by the arrows g. The pressure thus applied continues until the protrusions are flattened and surface c is continuous and is entirely level. It will be noted that during this hammering action the hammer a has not moved laterally in contact with the surface c or the protrusions e thereof. After the hammering has been completed the electrodeposition continues, with further periodic hammering until the desired thickness is obtained as indicated by Fig. 1c wherein, it will be noted, that the internal metal structure is entirely free of flaws, or laminations.

This method of hammering is to be contrasted with that illustrated in Figs. 1x, 1y and 1z, wherein the tool

*a* moves laterally in relation to the surface *c* as designated by the arrow *h* and, by frictional abrasion, moves the protrusions *e* and displaces first one (Fig. 1*x*) and then the other (Fig. 1*y*) laterally of the cathode surface to positions *e'* where they may be loosely superimposed on the outside of the surrounding cathode surface. After further electrodeposition the completed structure is typified, as shown in Fig. 1*z*, by pockets *p* containing electrolyte. For certain purposes these pockets have a useful function, as will be hereinafter referred to. The action of the tool *a* in laterally displacing metal particles where frictional abrasion occurs, as illustrated in Figs. 1*x* to 1*z*, is not confined to the displacement of protrusions *e*, as non-protruding portions of the surface are similarly displaced. These views are merely diagrammatic and do not, of course, indicate the complex physical changes taking place when pressures are applied to a cathode surface. However, they will serve to illustrate the principle of my invention.

When the hammer mechanism constructed as described with reference to Figs. 6 to 8, inclusive, of my prior Patent No. 2,540,175, are employed the working action illustrated in Figs. 1*a*, 1*b* and 1*c*, effecting displacement of the metal particles only inside the cathode surface, is obtained and the frictional abrasion of Figs. 1*x*, 1*y* and 1*z*, resulting in outside displacement, is avoided.

I shall now describe a further embodiment which employs, in addition to the hammers which so operate, a supplemental pressure applying element that is allowed to dwell against the surface of the deposited metal purposely to provide frictional contact and thereby to form laminations in selected areas. An article made with such laminations is useful for making such articles as heat exchangers and the like.

Referring to Figs. 2 to 12, inclusive, I have shown my dual-mandrel, tube-manufacturing machine.

Suitably mounted on opposite sides of the working tank 2' are electromagnets 400 and 402 (Fig. 3*a*) one for each of the mandrels 10'. Pivoted to the side wall of the tank in position to be acted on by each of these electromagnets is a bell crank 404 (Fig. 9) one arm of which carries an etched glass roller 406 and the other arm of which, shown retracted by spring 408, is adapted to be attracted by magnet 402 to press the glass roller 406 against the metal on the surface of the mandrel 10'.

The electromagnets 400 and 402 are energized simultaneously from a power source 410 (Fig. 4) by parallel identical circuits, typically illustrated by wire 414 leading to magnet 400 and by wire 418 leading to pattern cylinder 420 adapted at times to make contact with one of a series of points 422 on rod 426 connected by lead 416 back to each magnet.

Figure 3:
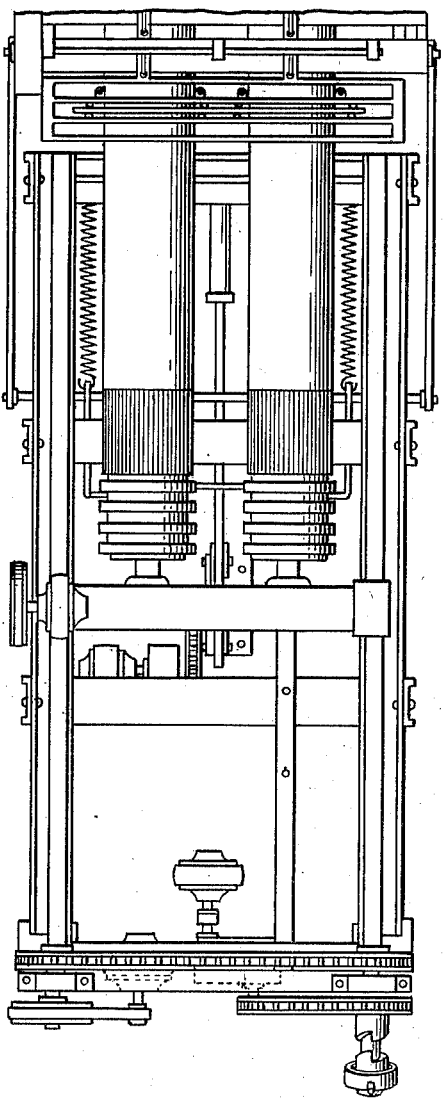

Cylinder 420, as shown by a comparison of Figs. 4, 3 and 10 is cut away in parallel recesses 430 extending circumferentially all the way around the cylinder except as interrupted by area 421 on the side of the cylinder seen in Fig. 4 and an identical area, not seen, on the opposite side. These areas, together with the areas 423 between recesses, constitute, in the aggregate, what I shall call the contacting area of the cylinder and the recesses constitute the non-contacting area.

A pattern cylinder thus formed is mounted on the end of each mandrel 10' and is adapted to rotate and to be advanced and retracted therewith.

As each mandrel with its pattern cylinder advances from its retracted position shown in dotted line in Fig. 4, its contacting areas electrically close circuit with the first point 422 and this circuit is maintained until the cylinder passes that point, except as it is interrupted by the non-contacting areas. The space separating successive contact points is, in the embodiment illustrated, slightly greater than the length of the pattern cylinder.

In practice I have found that in the areas of the deposited metal contacted by the glass roller fine metal particles are ground off the surface and then immediately mechanically redeposited, the deposit being of very minute particles analogous to the deposit of graphite particles made when a pencil marks a sheet of paper. Indeed, as an alternative, I could employ a graphite pencil rubbing against the cathode to produce the same surface deposit. In enlarged scale I have shown this action diagrammatically in Figs. 1*x*, 1*y* and 1*z* wherein is indicated how laminations are formed in the metal structure. As I have stated, a small quantity of electrolyte becomes entrapped between such laminations so that when the tubing is thereafter heat-treated the laminated areas expand from the vapor pressure of such electrolyte. Thus, in Fig. 5 the glass roller 406 is shown contacting the surface layer 500 of metal that has been deposited during the advancing movement of the mandrel from the time it entered the tank until it arrived oposite the roller 406. Thereafter, following the contacting, the surface of the metal thus contacted advances with the mandrel beyond the reach of the roller 406 and during its progress from the roller to the end of the tank, a further annular layer of metal 501 is added to the layer 500. Assuming that, in the operation of Fig. 5, the engagement of the roller occurred as the result of a contact point in the position of 422*a* of Fig. 4 wherein it makes electrical contact with the pattern cylinder only in the areas 421 on opposite sides of the cylinder and not in the recess 430, a lamination 502 will be formed on one side of the cylinder and a corresponding lamination 504 will be formed on the opposite side. After electrodeposition is completed and the cylinder is removed, it is then heat-treated and the entrapped moisture causes expansion of the laminated areas as illustrated in Fig. 5 to produce pockets 510 and 512 bounded on the inside by the metal 500 deposited prior to the action of the roller and on the outside by the metal 501 deposited after the lamination was formed.

Using a pattern cylinder of the configuration shown, a chambered tubing of the sort illustrated in Figs. 11 and 12 would be formed having channels 520 resulting from contact with the areas 423 of the pattern cylinder, connected portions 522 corresponding to the non-contacting areas of the cylinder and the side channels 510 and 512 corresponding to the opposite areas 421 on the cylinder, and affording communication between successive channels 520.

It is believed that the construction and mode of operation of my machine, described in greater detail in my Patent No. 2,540,175, will be clearly understood from the foregoing description.

I claim:

1. The method of making hollow metal articles by electrodeposition which includes working the deposited metal successively in different ways during the electrodeposition process comprising, first, working the cathode surface by moving metal particles from one position to another entirely within the cathode surface by pressing on electrodeposited surface particles of the cathode with a tool only in directions substantially normal to the surface of working contact so as to avoid lateral displacement of said surface particles to loosely superimposed positions outside of said cathode surface, second, working the cathode surface in selected areas by moving metal particles from one position to another loosely superimposed position outside of said cathode surface, and, third, working metal electrodeposited over said selected areas by repeating said first described working process.

2. The method of making hollow metal articles by electrodeposition which includes working the deposited metal successively in different ways during the electrodeposition process comprising, first, working the cathode surface by moving metal particles from one position to another entirely within the cathode surface by pressing on electrodeposited surface particles of the cathode with a tool only in directions substantially normal to the surface of working contact so as to avoid lateral displacement of said surface particles to loosely superimposed positions outside of said cathode surface, second, working the cathode surface in selected areas by moving metal particles from one position to another loosely superimposed position outside of said cathode surface, and, third, working metal electrodeposited over said selected areas by repeating said first described working process, thereby entrapping plating solution under the loose particles, and, finally, separating the layers in said selected areas.

3. The method of making hollow metal articles by electrodeposition which includes working the deposited metal successively in different ways during the electrodeposition process comprising, first, working the cathode surface by moving metal particles from one position to another entirely within the cathode surface by pressing on electrodeposited surface particles of the cathode with a tool only in directions substantially normal to the surface of working contact so as to avoid lateral displacement of said surface particles to loosely superimposed positions outside of said cathode surface, second, working the cathode surface in selected areas by moving metal particles from one position to another loosely superimposed positions outside of said cathode surface, and, third, working metal electrodeposited over said selected areas by repeating said first described working process, thereby entrapping plating solution under the loose particles, and finally heating the metal body to expand said entrapped plating solution, thereby producing hollows in said selected areas internally of the metal structure.

4. The method of making hollow metal articles by electrodeposition which includes working the deposited metal successively in different ways during the electrodeposition process comprising, first, working the cathode surface by moving metal particles from one position to another entirely within the cathode surface by pressing on electrodeposited surface particles of the cathode with a tool only in directions substantially normal to the surface of working contact so as to avoid lateral displacement of said surface particles to loosely superimposed positions outside of said cathode surface, second, working the cathode surface in selected areas by moving metal particles from one position to another outside the cathode surface by pressing on electrodeposited surface particles of the cathode with a tool in directions so deviating from the normal to the surface of working contact as to induce lateral displacement of said surface particles to loosely superimposed positions outside of said cathode surface, and, third, working metal electrodeposited over said selected areas by repeating said first described working process.

5. The method of making hollow metal articles by electrodeposition which includes during the electrodeposition process, first, working the cathode surface by moving metal particles from one position to another entirely within the cathode surface by pressing on electrodeposited surface particles of the cathode with a tool only in directions substantially normal to the surface of working contact so as to avoid lateral displacement of said surface particles to loosely superimposed positions outside of said cathode surface, second, depositing particles in loosely superimposed positions outside of said cathode surface, in selected areas thereof, and, third, working metal electrodeposited over said selected areas by repeating said first described working process, thereby entrapping plating solution under the loose particles, and finally heating the metal body to expand said entrapped plating solution, thereby producing hollows in said selected areas internally of the metal structure.

References Cited in the file of this patent

UNITED STATES PATENTS

| 916,033 | Schmidt | Mar. 23, 1909 |
| 1,567,079 | Porzel | Dec. 29, 1925 |
| 1,723,659 | Rosenqvist | Aug. 6, 1929 |
| 2,114,161 | Antisell | Apr. 12, 1938 |

FOREIGN PATENTS

| 11,778 | Great Britain | of 1888 |